US012669221B2

(12) United States Patent
Vouriot et al.

(10) Patent No.: US 12,669,221 B2
(45) **Date of Patent: *Jun. 30, 2026**

(54) SUPPLY TANK FOR INFLAMMABLE GAS WITH PROTECTIVE CAP

(71) Applicant: Vomar Industries Inc., La Salle (CA)

(72) Inventors: Marcel Joseph Andre Vouriot, La Salle (CA); Robert Amborsky, Winnipeg (CA); Patrick Badiou, Sanford (CA); Sean Oosterveen, Winnipeg (CA)

(73) Assignee: Vomar Industries Inc., La Salle (CA)

( * ) Notice: Subject to any disclaimer, the term of this patent is extended or adjusted under 35 U.S.C. 154(b) by 8 days.

This patent is subject to a terminal disclaimer.

(21) Appl. No.: 18/895,766

(22) Filed: Sep. 25, 2024

(65) Prior Publication Data

US 2025/0084965 A1 Mar. 13, 2025

Related U.S. Application Data

(63) Continuation-in-part of application No. 17/989,928, filed on Nov. 18, 2022, now Pat. No. 12,140,274.

(51) Int. Cl.
*F17C 13/04* (2006.01)
*F17C 1/02* (2006.01)

(52) U.S. Cl.
CPC ................ *F17C 13/04* (2013.01); *F17C 1/02* (2013.01); *F17C 2203/011* (2013.01); *F17C 2205/0308* (2013.01); *F17C 2205/0335* (2013.01); *F17C 2221/035* (2013.01); *F17C 2260/04* (2013.01)

(58) Field of Classification Search
CPC .............. F17C 13/06; F17C 2205/0308; F17C 2201/0109; F17C 2205/0305; F17C 2205/0323; F17C 2205/0382; F17C 2223/0123; F16J 13/00; F16J 13/02
See application file for complete search history.

(56) References Cited

U.S. PATENT DOCUMENTS 2,661,113 A * 12/1953 Benson .................. F17C 13/06 220/288
3,776,412 A * 12/1973 Mink ...................... F17C 13/06 220/726
4,729,488 A * 3/1988 Bullock, III ........... B65D 41/32 220/276

(Continued)

*Primary Examiner* — Don M Anderson
(74) *Attorney, Agent, or Firm* — Adrian D. Battison; Kyle R. Satterthwaite; Ade & Company Inc

(57) ABSTRACT

A propane tank with a valve passage containing a valve has a protection cap with a projecting pin which extends into the passage adjacent the valve to provide a secondary seal. The projecting pin is defined by an annular sleeve surrounding a hollow interior extending up to the upper wall where the sleeve has an outside surface tapered from the upper wall to the remote end and an inside surface tapered from the remote end to the upper wall and the passage carries an O-ring seal arranged so that movement of the upper wall in a direction away from the passage caused by pressure release is insufficient to cause release of the secondary seal between the projecting pin member from the O-ring seal. The projecting element extends into the hollow interior to a position beyond the remote end of an actuating pin of the valve.

13 Claims, 5 Drawing Sheets

(56) References Cited

U.S. PATENT DOCUMENTS

| | | | | | |
|---|---|---|---|---|---|
| 5,158,204 | A * | 10/1992 | Martrich | F17C 13/06 220/304 |
| 5,160,065 | A * | 11/1992 | Libes | F17C 13/123 220/725 |
| 5,190,072 | A * | 3/1993 | McAnally | F16K 17/04 137/543.13 |
| 5,975,121 | A * | 11/1999 | Arzenton | F17C 13/06 137/557 |
| 12,140,274 | B2 * | 11/2024 | Vouriot | F17C 13/02 |
| 2007/0284380 | A1 * | 12/2007 | Busby | F17C 13/06 220/727 |
| 2011/0139801 | A1 * | 6/2011 | Cho | F17C 13/06 220/727 |
| 2011/0278316 | A1 * | 11/2011 | Herzer | F17C 13/06 137/382 |
| 2015/0260343 | A1 * | 9/2015 | Baune | F17C 1/00 206/0.6 |
| 2015/0260345 | A1 * | 9/2015 | Frenal | F17C 1/00 220/726 |
| 2016/0123496 | A1 * | 5/2016 | Buermann | F16K 35/10 137/15.01 |
| 2019/0226641 | A1 * | 7/2019 | Ogiwara | F17C 13/12 |
| 2022/0128198 | A1 * | 4/2022 | Kriese | F17C 13/002 |
| 2022/0260206 | A1 * | 8/2022 | Sawai | F17C 1/04 |

* cited by examiner

SUPPLY TANK FOR INFLAMMABLE GAS WITH PROTECTIVE CAP

This application is a Continuation in Part Application of application Ser. No. 17/989,928 filed Nov. 18, 2022 which is pending.

This invention relates to a protective cap for a tank for inflammable gas including the structure of the tank itself. In particular it pertains to a protective cap for a tank or container with a valve for controlling discharge and refilling of the tank.

BACKGROUND OF THE INVENTION

Typical LPG or propane storage tanks, bottles, containers or cylinders have a valve device on the top or head of the tank which could be vulnerable to damage if dropped or falling over. An impact on the valve that is sufficient to break the valve from its threaded attachment to the tank can lead to a very dangerous accident. For this reason, tanks are required to have some protection around the valve. Typical 4 to 40 pound propane tanks which are portable for gas grills and the like have a welded metal ring surrounding the valve for protection.

Smaller tanks such as 1 or 2 pound propane tanks can be used for camping equipment and torches do not use such a protective metal ring, primarily due to weight reasons because also in some cases they are used for hand held devices. Currently small propane tanks only have a thin plastic disposable cap which protects the threads of the valve but does nothing to prevent damage to the valve's attachment to the tank should it be dropped or knocked over.

SUMMARY OF THE INVENTION

It is one object of the present invention to provide a gas tank for containing an inflammable gas of the type which has a primary sealing valve operable to allow release of the gas as required which includes an improved protective cap which cooperates with the tank to provide an improved sealing action for safety against release of the gas in the event of leakage or failure of the primary sealing valve.

According to a first aspect of the invention there is provided a refillable supply tank for an inflammable gas comprising:

- a tank body defining a container with a wall surrounding a hollow interior for receiving the gas and an opening in the wall;
- a collar mounted in the opening and attached to the wall at the opening, the collar defining a central bore to allow gas to escape from the interior and to allow refillable gas to be fed into the interior;
- a generally cylindrical valve receptacle distinct from the collar and carrying an external male screw thread engaged into an internal female screw thread in the bore of the collar;
- the valve receptacle defining a passage therethrough extending from an end face of the valve receptacle into the interior of the tank body;
- a valve body in the passage arranged to provide a primary seal of the passage against escape of the gas and operable to open the passage to allow the escape when required;
- and a valve protection cap for covering the valve receptacle with the valve body therein and at least part of the collar;
- the valve protection cap including an upper wall and at least one depending peripheral wall;
- the valve protection cap including at least one engagement surface thereon which engages onto the outside of the collar;
- wherein the upper wall of the valve protection cap includes an elongate projecting pin member projecting from a position underneath the upper wall of the valve protection cap which extends into and engages into the passage adjacent the valve body to provide a secondary seal with the passage to supplement the primary seal of the valve body in the passage.

In one preferred arrangement, the collar has an outer peripheral surface of a larger diameter than an outer peripheral surface of the valve receptacle so that the engagement surface of the valve protection cap is spaced outwardly of the outer peripheral surface of the valve receptacle. In this arrangement preferably the peripheral wall is spaced outwardly of the outer peripheral surface of the valve receptacle so as to define an open shoulder area outside the end face of the valve receptacle underneath the upper wall of the valve protection cap which acts as a crush area to receive impact loads. In this way the plastic cap can deform into the space defined to take up the impact loads to reduce the forces on the valve itself.

In one preferred arrangement, the upper wall of the valve protection cap engages the end face of the valve receptacle. This can act therefore as a secondary or further seal to reduce the amount of released gas should the valve itself fail. In one preferred arrangement, the upper wall of the valve protection cap at the end face of the valve receptacle includes a ring underneath the upper wall which extends into and engages the passage to transfer loading between the valve receptacle and the valve protection cap. This also can act again as a further sealing action.

In one preferred arrangement, the valve protection cap includes an annular skirt extending downwardly from the depending peripheral wall into engagement with the actual wall of the tank surrounding the opening so as to transfer impact loads from the valve protection cap to the wall of the tank independently of the loads transferred at the valve assembly.

In one preferred arrangement, the annular skirt extends downwardly into engagement with the tank wall around the opening from a position adjacent the engagement surfaces so that the skirt and the peripheral wall are relatively small and closely surround the valve arrangement.

In another preferred arrangement, the annular skirt extends downwardly into engagement with the wall from a position adjacent the upper wall. In this case the peripheral wall and the skirt are much larger with the intention to engage the tank upper wall at a position adjacent its outer edge.

In one preferred arrangement, the outside of the collar includes an external male screw thread and the engagement surface of the valve protection cap defines a female thread on a plurality of separate radially outwardly and inwardly displaceable sections so that the valve protection cap can be pushed axially on to the male screw thread while the sections are displaced inwardly whereupon the sections extend by spring force outwardly to engage into the male thread thus requiring the cap to be removed rotationally by unscrewing the sections from the male thread.

In one preferred arrangement, there is a tear off tab projection outwardly from one side of the depending peripheral wall which disconnects from the peripheral wall by pulling by the user when first used thus providing an indication of use but leaving the peripheral wall intact to allow replacement on the collar.

In one preferred arrangement, the depending peripheral wall is formed as a complete surface fully which surrounds the collar without openings.

According to a further aspect of the invention there is provided a refillable supply tank for an inflammable gas comprising:

a tank body defining a container with a wall surrounding a hollow interior for receiving the gas and an opening in the wall;

a valve support component mounted in the opening and defining a passage therethrough extending from an end face of the valve support component into the interior of the tank body;

a valve body in the passage arranged to provide a primary seal of the passage against escape of the gas and operable to open the passage to allow the escape when required;

and a valve protection cap for covering the valve support component with the valve body therein;

the valve protection cap including an upper wall and at least one depending peripheral wall which extends around the valve support component;

wherein the upper wall of the valve protection cap includes an elongate projecting pin member projecting from the upper wall of the valve protection cap to a remote end of the projecting pin member spaced from the upper wall;

wherein the projecting pin member extends into and engages into the passage to provide a secondary seal with the passage to supplement the primary seal of the valve body in the passage;

wherein the projecting pin member is defined by an annular sleeve surrounding a hollow interior where the hollow interior of the sleeve extends along the projecting pin member from the remote end of the projecting pin member to the upper wall; and and wherein the annular sleeve has an outside surface extending from the upper wall to the remote end which outside surface tapers from the upper wall to the remote end so that a diameter of the outer surface at the upper wall is greater than a diameter of the outer surface at the remote end and wherein the annular sleeve has an inside surface surrounding the hollow interior extending from the upper wall to the remote end which inside surface tapers from the remote end to the upper wall to so that a diameter of the inside surface at the upper wall is less than a diameter of the outer surface at the remote end.

In one preferred arrangement, the passage carries an O-ring seal surrounding and engaging the outer surface of the projecting pin member to form the secondary seal therewith, wherein the valve protection cap is arranged such that release of pressure from the tank body through the passage caused by leakage from the valve body causes movement of the upper wall in a direction away from the passage and wherein the projecting pin member is arranged such that the movement of the upper wall under the pressure is insufficient to cause release of the secondary seal between the projecting pin member from the O-ring seal In one preferred arrangement, the diameter of the outer surface at the O ring seal is arranged such that the outer surface engages and compresses the O-ring seal to form the secondary seal.

In one preferred arrangement, the movement of the upper wall under the pressure is insufficient to cause the diameter of the tapered outer surface at the O ring seal to release from engagement and compression of the O-ring seal to form the secondary seal.

In one preferred arrangement, the projecting pin member has a length from the O-ring seal to the remote end of at least 3 mms and preferably at least 5 mm.

In one preferred arrangement, the valve body in the passage includes a projecting element extending longitudinally of the passage and operable to open the passage to allow the escape when required wherein the projecting element extends into the hollow interior to a position beyond the remote end of the projecting pin member.

It will be appreciated that the use of the terms upward and downward herein are for convenience of simple definition only since the tank can be rotated into different orientations. Thus the construction is defined with the valve at the top as a simple way to express relative locations.

BRIEF DESCRIPTION OF THE DRAWINGS

A more complete appreciation of the invention and many of the advantages thereof will be readily obtained as the same becomes better understood by reference to the detailed description when considered in connection with the accompanying drawings, wherein.

DETAILED DESCRIPTION

Figure 1:
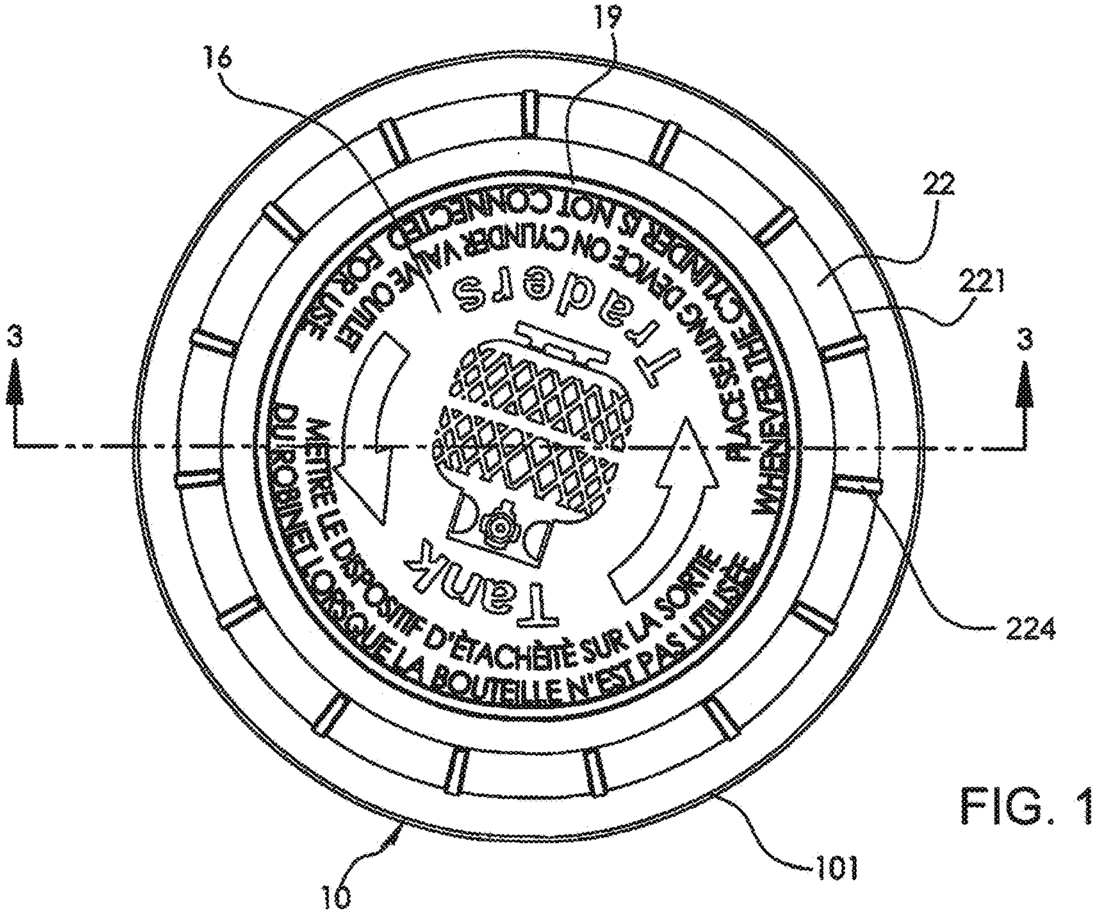
FIG. 1 is top plan view of a first embodiment of the protective cap and a typical tank it is designed to protect.

The protective cap described herein is preferred to be made of an injection molded plastic, although other materials could be used. The cap installs onto the valve by threading it onto the valve's threads, but it could also snap over the threads. An embodiment of the cap may be capable of performing a secondary seal with the outlet of the main service valve, such that if the tank's main service valve leaked, the cap will seal the tank and prevent dangerous accidental discharge of the flammable gas.

The supply tank for propane or other inflammable gas as shown in the figures includes a tank body 10 of a sheet metal defining a container with a wall 101 surrounding a hollow interior 102 for receiving the gas and an opening 103 in the wall typically at a top of the wall. The tank has a cylindrical shape with the top wall converging inwardly and upwardly smoothly to the top opening. A base (not shown) is typically flat to stand upright on a flat surface.

A metal collar 11 is welded into the opening and attached to the wall at the opening the collar. The collar includes am outer ring 111 which sits on the top wall of the tank at the opening and is welded to the top wall by a surrounding bead 112. Below the ring the collar is reduced in diameter so as to form a cylindrical portion 113 which projects into the tank through the opening to a bottom end 114 located within the tank below the top wall.

On an outer surface of the ring 111 is provided a male screw thread 115 which extends upwardly around the ring to a top edge 116 of the ring located above the top wall of the tank.

The collar defines a central bore 117 extending through the full height of the collar and carrying a female screw thread 119 in a lower section and an annular recess of greater diameter in an upper section at the upper end 116. The collar is typically formed of steel to weld to the steel tank to provide the required strength to contain the gas under pressure as determined by safety rules.

A generally cylindrical valve receptacle 12 carries on a lower cylindrical portion an external male screw thread 121 which is engaged into the internal female screw thread 119 in the bore of the collar. The receptacle 12 is typically formed of brass so that it is distinct from the collar and is formed as a separate component to be threaded into the collar. Thus the tank itself is separate from the valve assembly defined by the receptacle.

The receptacle 12 has a ring 122 at the top of the thread 211 so that an O-ring 13 can be compressed between a bottom of the ring 212 and the top of the portion 113 of the collar 11 to provide a seal between the receptacle and the collar.

The receptacle further has an upper portion 123 with a male thread 124 to receive a fitting from the appliance to be fed with the gas. At a top of the thread 124 is provided a horizontal top face 125.

The valve receptacle 12 defines an axial passage 126 therethrough extending from the upper end face 125 of the valve receptacle into the interior 102 of the tank body to allow gas to escape from the interior and to allow replacement gas to be fed into the interior. The passage includes a lower generally cylindrical portion 127 shaped to confine a Schrader valve 14 and an upper portion 128 of larger diameter breaking out on to the upper face 125. The valve receptacle 12 and the collar thus cooperate to form a valve support component mounted in-the opening and defining an axial passage therethrough extending from an end face of the valve support component into the interior of the tank body.

The Schrader valve 14 includes a valve body in the passage arranged to seal the passage against escape of the gas and operable to open the passage to allow the escape when required. The valve as is well known includes an upper pin 141 to operate the valve when required.

Figure 2:
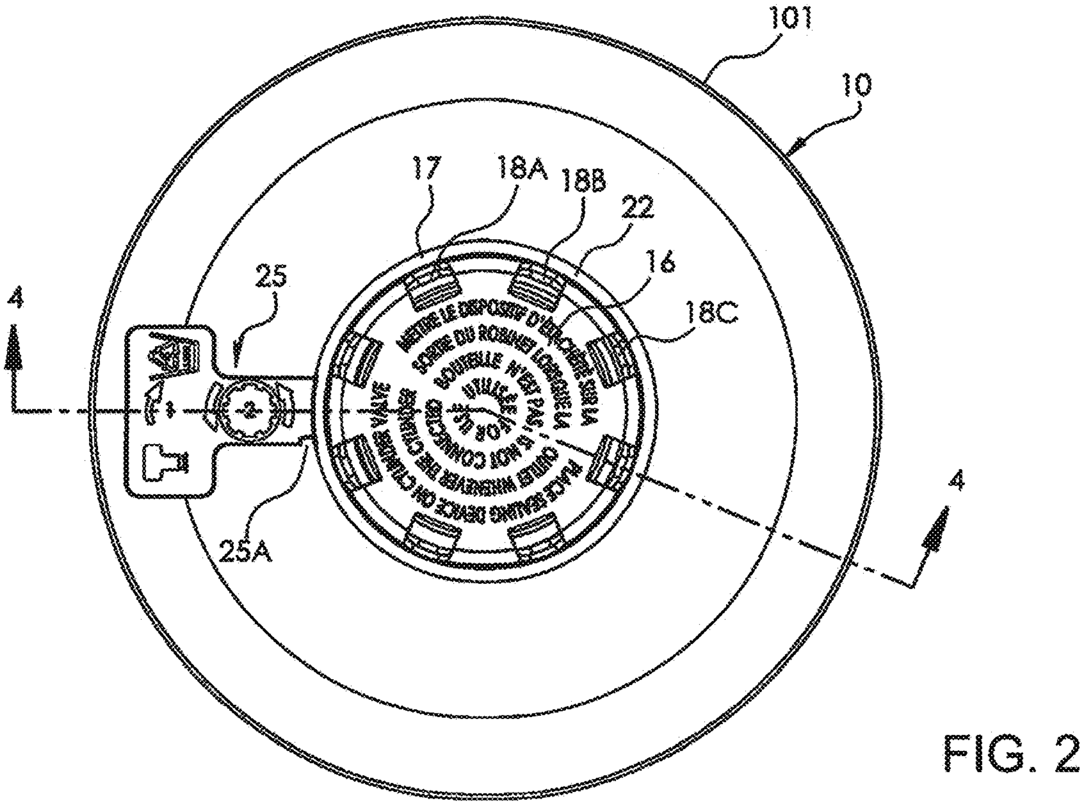
FIG. 2 is top plan view of a first embodiment of the protective cap and a typical tank it is designed to protect.
Figure 3:
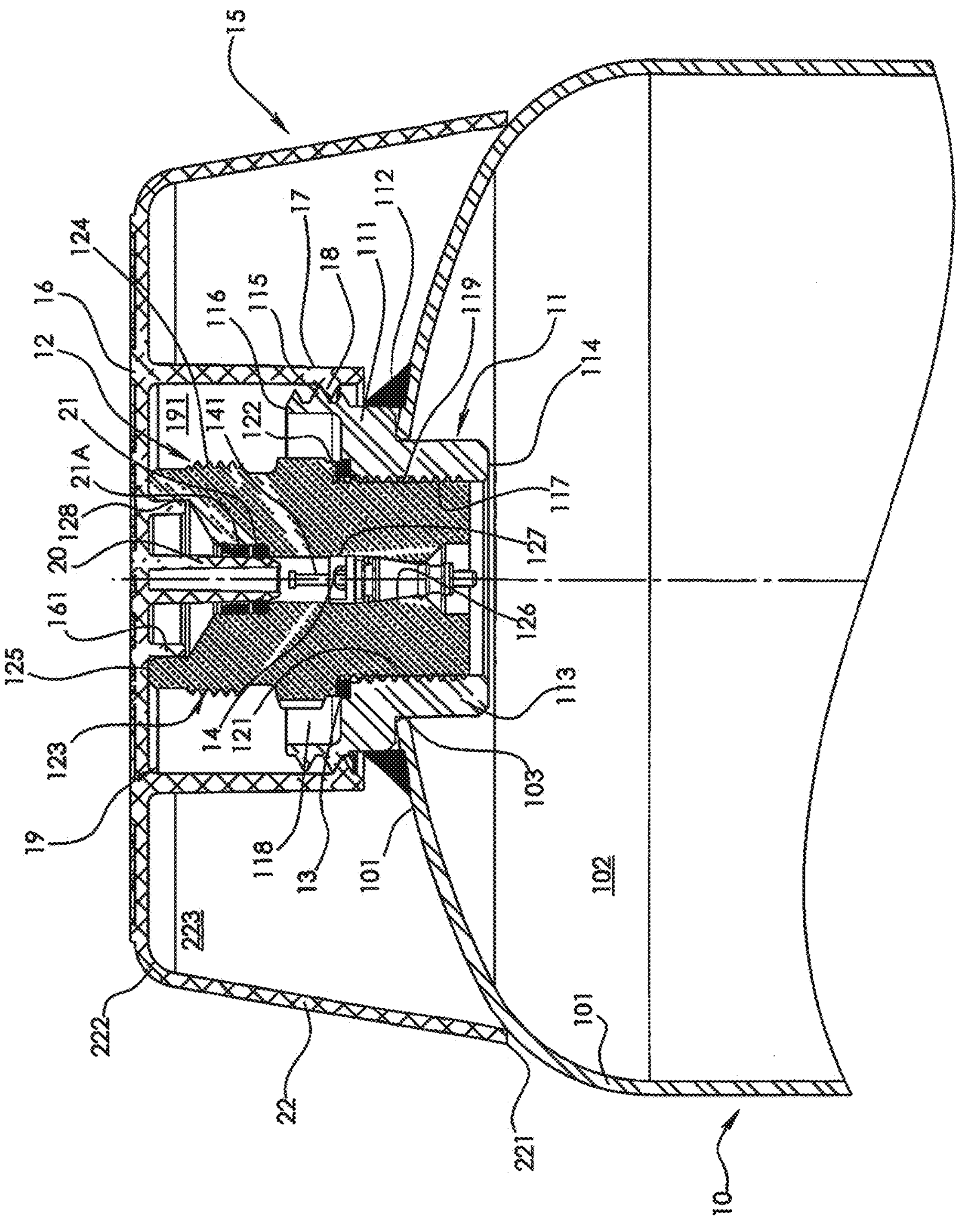
FIG. 3 is a cross sectional view through the first embodiment of the protective cap along the lines 3-3 of FIG. 1.
Figure 4:
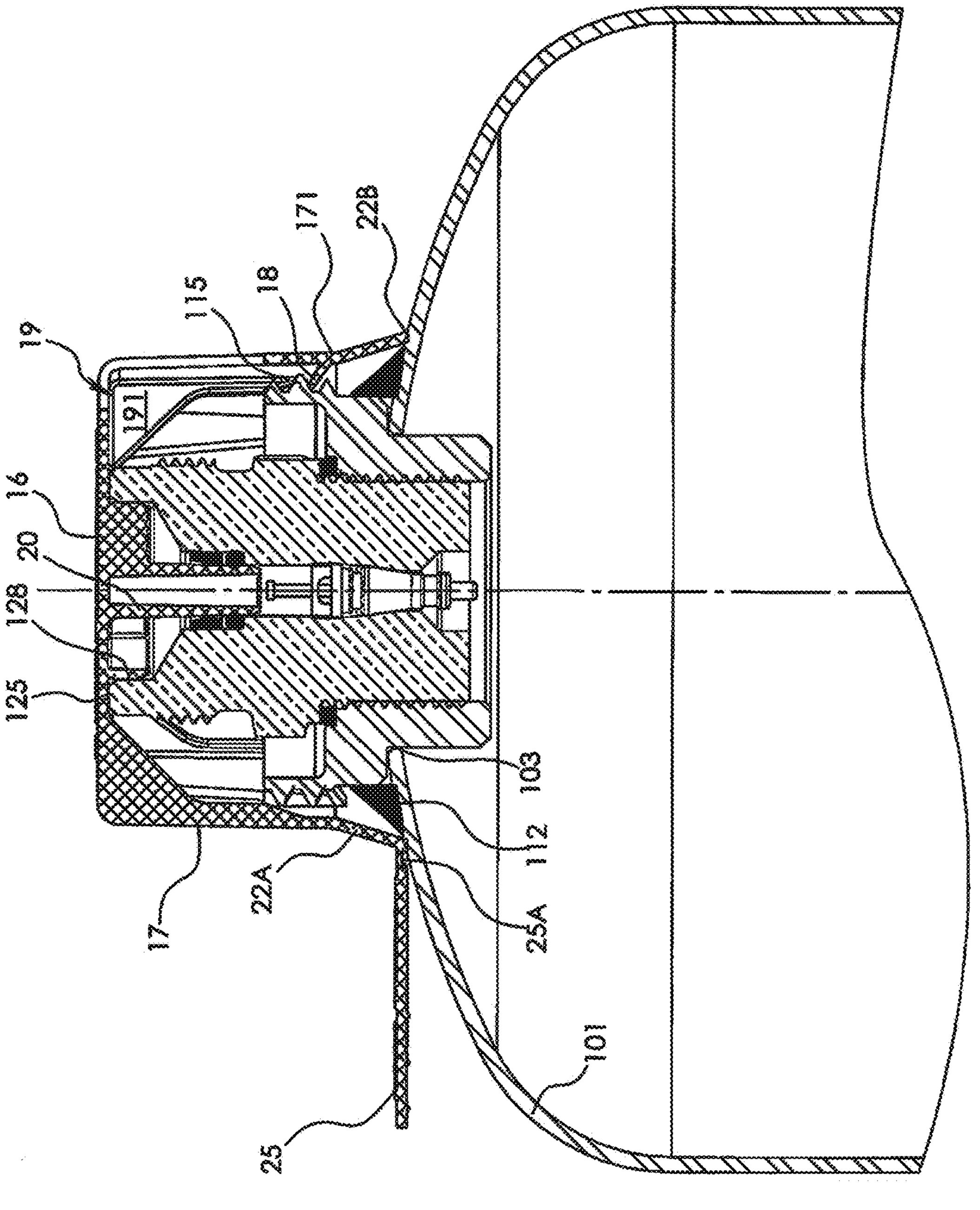
FIG. 4 is a cross sectional view through the first embodiment of the protective cap along the lines 4-4 of FIG. 2.

The above construction is common to the first embodiments of FIGS. 1 and 3 and to the second embodiment of FIGS. 2 and 4.

Both embodiments include a valve protection cap 15 for covering valve support component and particularly the valve receptacle 12 thereof with the valve body 14 and the collar 111. The valve protection cap 15 includes an upper wall 16, at least one depending peripheral wall 17 and at least one engagement surface 18 thereon which engages onto the outside of the collar to hold the cap in place on the tank. The valve protection cap thus includes an upper wall and at least one depending peripheral wall which extends-around the valve support component.

As set out above, the collar has an outer peripheral surface at the male thread 115 of a larger diameter than an outer peripheral surface of the valve receptacle at the thread 124 so that the engagement surface 18 defined by a female thread of the valve protection cap 15 is spaced outwardly of the outer peripheral surface of the valve receptacle at the thread 124. This defines an open shoulder area 19 outside the end face 125 of the valve receptacle 12 underneath the upper wall 16 of the valve protection cap which provides a space 191 acts as a crush area to receive impact loads causing the cap to crush before the load reaches the edge of the valve receptacle 12 at the end face 125.

The upper wall 16 of the valve protection cap 15 engages the end face 125 of the valve receptacle and lies flat across the end face with no space therebetween. The upper wall 16 of the valve protection cap is flat and circular and at the end face 125 of the valve receptacle includes a ring 161 molded as integral with the upper wall underneath the upper wall which extends into and engages the passage 126 at the upper portion 128 to transfer loading between the valve receptacle and the valve protection cap. The ring has an outer face matching an inner face of the portion 128 so as to provide intimate engagement therebetween when the cap is forced into place on the tank.

The upper wall 16 at the end face 125 of the valve receptacle includes a projecting cylindrical pin 20 underneath and integral with the upper wall 16 which extends into and engages into the passage 117 adjacent the valve body 14 to provide a seal with the passage to supplement the seal defined by the valve body in the passage. A sealing material 21 in the passage surrounds the pin to improve the sealing action. Any movement of the cap due to thermal changes or to slight misplacement will cause or allow slight sliding action of the pin 20 in the material 21 while maintaining the required sealing action as the components are concentric and remain in contact.

The upper wall 16 of the valve protection cap carries the elongate projecting pin member 20 projecting downwardly from a position underneath the upper wall 16 which extends into and engages into the passage 117 adjacent the valve body 14 to provide a secondary seal with the passage to supplement the primary seal of the valve body in the passage.

As shown in the figures, the projecting pin member 20 is defined by an annular sleeve 201 surrounding a hollow interior 202 where the hollow interior of the sleeve extends along the projecting pin member 20 from the remote end 203 of the projecting pin 20 member to the upper wall 16. Thus the whole length of the pin member 20 is hollow up to the underside of the upper wall 16. The pin member 20 extends from sealing material 21 to the remote end 203 spaced from the sealing material 21.

The valve protection cap includes an annular skirt 22 extending downwardly from the peripheral wall into engagement with the wall 101 of the tank at a bottom edge 221 surrounding the opening 103 so as to transfer impact loads from the valve protection cap to the wall of the tank.

In FIGS. 1 and 3, the annular skirt extends 22 downwardly into engagement with the wall from a position 222 adjacent the upper wall 16. That is the depending skirt 22 is a separate component from the wall of the cap which engages onto the thread of the collar. This forms an additional part of the cap of much larger diameter than the collar and the wall 16 which defines a larger crush zone 223 to accept larger impact forces. In this embodiment the lower edge 221 of the wall is closely adjacent an outer wall of the tank to provide an improved protection.

In FIGS. 2 and 4 the annular skirt 22A extends downwardly into engagement with the wall of the tank from a position adjacent the bottom edge 171 of the depending wall 17 so that the skirt is much smaller than the arrangement of FIG. 3. In this embodiment the bottom edge 22B engages the tank just outside the weld bead 111 around the opening 103.

Engagement between the cap and the collar is provided by engagement between the external male screw thread 115 and the female thread 18.

In FIGS. 1 and 3, the thread 18 on the cap is a continuous annular thread fully surrounding the interior of the cap so that the cap is screwed on to the tank and removed also by a screw action in the opposite direction. This provide a most effective connection and improved protection but requires more input from the user which may be resisted. Also this cap is larger and required more plastic in the molding which can increase cost.

In the alternative arrangement shown in FIGS. 2 and 4, the thread on the inside of the cap is not continuous but instead is formed on a plurality of separate sections 18A, 18B, 18C etc which at angularly spaced positions around the cap. These portions are individually displaceable in a radially outward direction so that the valve protection cap can be pushed axially on to the male screw thread by the sections moving outwardly to snap over the male thread. This avoids a screwing action although the cap can be screwed into place. As the sections carry female thread portions the cap should be removed rotationally by unscrewing the sections from the male thread.

As shown in the embodiment of FIGS. 2 and 4, there is a tear off tab projection 25 extending outwardly from one side of the depending peripheral wall at the bottom edge of the skirt 22A. This is a marker to show to the user that the tank is filled and ready for use. The tab 25 disconnects at a point 25A from the bottom edge portion of the peripheral wall when pulled providing an indication to the user that this tank has been put into use but the disconnection at point 25A leaves the peripheral wall intact. This provides a cap which can be used for replacement on the collar when the tank has been separated from the appliance.

In both embodiments the external ring presented to the use by the peripheral wall 22 in FIG. 3 or by the depending wall 17 has a surface which fully surrounds the collar without openings so as to provide complete protection around the full extent without possibility of penetration.

Figure 5:
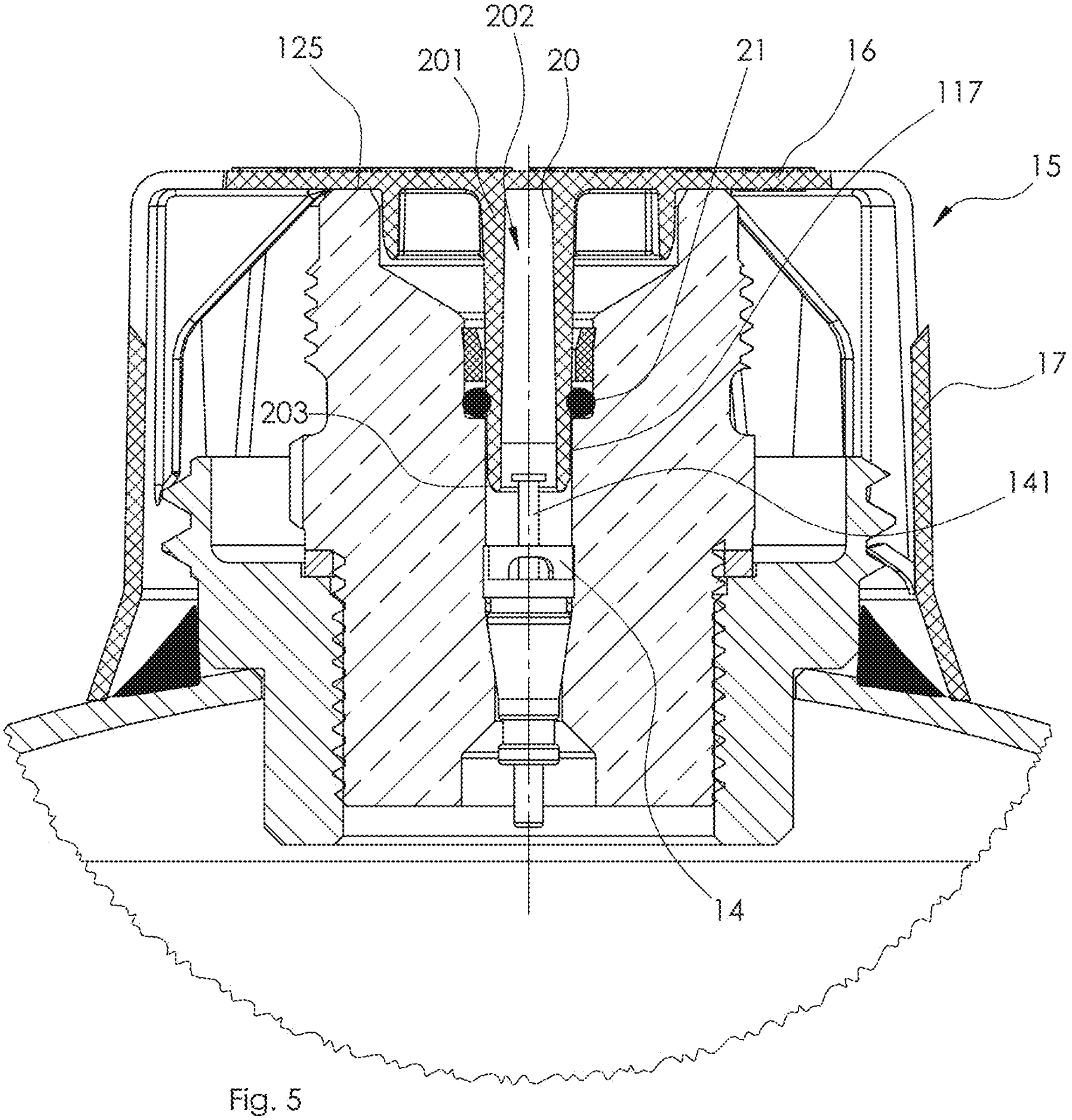
FIG. 5 is a cross sectional view through a modified version of the first embodiment of the protective cap along the lines 4-4 of FIG. 2.
Figure 6:
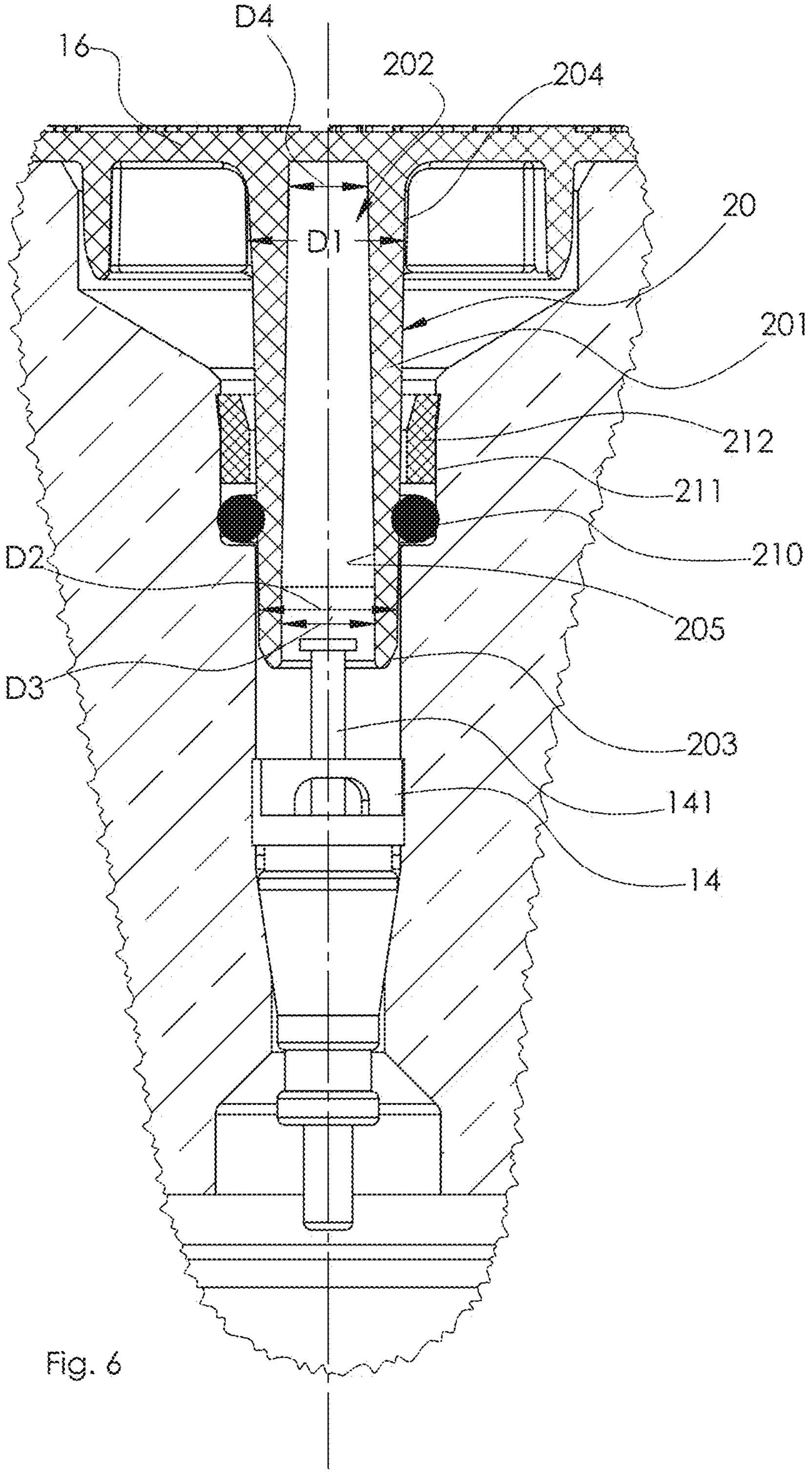
FIG. 6 is an enlarged portion only of the cross sectional view of FIG. 5.

Turning now to FIGS. 5 and 6 there is shown a modified arrangement in which the construction of the projecting pin member is modified to provide a more effective sealing action and to provide a more effective arrangement which can be manufactured in a more simple manner.

In this arrangement, the annular sleeve 201 of the projecting pin 20 has an outside surface 204 extending from the upper wall 16 to the remote circular end 203 where the outside surface 204 is generally cylindrical and circular in cross section but tapers in diameter from the upper wall 16 to the remote end 203 so that the diameter D1 of the outer surface at or adjacent the upper wall 16 is greater than a diameter D2 of the outer surface at or adjacent the remote end 203.

Also the annular sleeve 201 has an inside surface 205 surrounding the hollow interior 202 extending from the upper wall 16 to the remote end 203 where the inside surface 205 tapers from as position at or adjacent the remote end 203 to a position at or adjacent the upper wall 16 so that the diameter D4 of the inside surface at the upper wall 16 is less than the diameter D2 of the inside surface at the remote end 203. In this way each of the outer surface and the inside surface gradually tapers and the thickness of the sleeve gradually decreases from the upper wall to the remove end.

The passage carries as the sealing material 21 an O-ring seal 210 surrounding and engaging the outer surface 204 of the projecting pin member 20 to form the secondary seal therewith. The O-ring seal 210 is received in a recess 211 in the passage 117 and is held in place against a bottom wall of the recess by clamping ring 212 also engaged in the same recess. The O-ring seal 210 is thus spaced upwardly from the remote end 203 and is held in place against axial movement along the passage. The outer surface 204 can thus slide into the O-ring with the effect of slightly compressing the O-ring outwardly into the recess as shown by the interference fit illustrated in FIG. 6.

In this way the cooperation between the O-ring and the outer surface provides for the valve protection cap an arrangement such that release of pressure from the tank body through the passage 117 is resisted by the secondary valve provided by the O-ring 210. Such release of the gas can be caused by leakage from the Schrader valve or failure of the valve and the high pressure released causes movement of the upper wall 16 by flexing of the cap in a direction away from the passage. For example the pressure in the tank can exceed 500 psi and can be as much as 1000 psi. it is necessary in this arrangement that the cap itself resists this release and prevent the escape of the gas either gradually due to a leak or catastrophically due to a failure. In both cases the release of flammable gas must be resisted in order to pass suitable safety codes. However this high pressure applied against the pin member 20 and the underside of the upper wall causes flexing of the cap and thus movement of the upper wall 16 of the cap away from the end face of the passage.

Thus the projecting pin member is arranged such that this movement of the upper wall under the pressure is insufficient to cause release of the secondary seal between the projecting pin member from the O-ring seal. This movement causes the diameter of the portion of the outer surface at the O-ring to decrease as the tapered outside surface moves upwardly. The amount of compression of the O-ring by the outside surface must be selected so that, both in the stable position as shown and at the retracted position of the pin member caused by the pressure from the escaping gas, the O-ring is compressed to maintain the secondary seal.

For this reason, the projecting pin member has a length from the O-ring seal 210 to the remote end of at least 3 mm and preferably at least 5 mm.

As shown in FIG. 6, the Schrader valve 14 includes a conventional actuation pin 141 extending axially along the passage where the length of the sleeve is selected so that the actuating pin 141 has an upper end which extends into the hollow interior to a position beyond the remote end 203 of the projecting pin member. This ensures that the sleeve has a length so that the outside surface of the sleeve extends beyond the O-ring sufficiently to ensure that disengagement and release of gas cannot occur under designed pressures

The invention claimed is:

1. A refillable supply tank for an inflammable gas comprising:

a tank body defining a container with a wall surrounding a hollow interior for receiving the gas and an opening in the wall;

a valve support component mounted in the opening and defining a passage therethrough extending from an end face of the valve support component into the interior of the tank body;

a valve body in the passage arranged to provide a primary seal of the passage against escape of the gas and operable to open the passage to allow the escape when required;

and a valve protection cap for covering the valve support component with the valve body therein;

the valve protection cap including an upper wall and at least one depending peripheral wall which extends around the valve support component;

wherein the upper wall of the valve protection cap includes an elongate projecting pin member projecting from the upper wall of the valve protection cap to a remote end of the projecting pin member spaced from the upper wall;

wherein the projecting pin member extends into and engages into the passage to provide a secondary seal with the passage to supplement the primary seal of the valve body in the passage;

wherein the projecting pin member is defined by an annular sleeve surrounding a hollow interior where the hollow interior of the sleeve extends along the projecting pin member from the remote end of the projecting pin member to the upper wall.

2. The refillable supply tank according to claim 1 wherein the valve support component has an outer peripheral surface of a larger diameter than an outer peripheral surface of the valve receptacle so that said at least one engagement surface of the valve protection cap is spaced outwardly of the outer peripheral surface of the valve receptacle.

3. The refillable supply tank according to claim 2 wherein said at least one depending peripheral wall is spaced outwardly of the outer peripheral surface of the valve receptacle so as to define an open shoulder area outside the end face of the valve receptacle underneath the upper wall of the valve protection cap which acts as a crush area to receive impact loads.

4. The refillable supply tank according to claim 1 wherein the upper wall of the valve protection cap at the end face of the valve receptacle includes a ring underneath the upper wall which extends into and engages the passage to transfer loading between the valve receptacle and the valve protection cap.

5. The refillable supply tank according to claim 1 wherein the valve protection cap includes an annular skirt extending downwardly from said at least one depending peripheral wall into engagement with the wall of the tank surrounding the opening so as to transfer impact loads from the valve protection cap to the wall of the tank.

6. The refillable supply tank according to claim 1 wherein the outside of the valve support component includes an external male screw thread and wherein said at least one engagement surface of the valve protection cap defines a female thread on a plurality of separate radially outwardly displaceable sections whereby the valve protection cap can be pushed axially on to the external male screw thread by outward displacement of the sections and can be removed rotationally by unscrewing the sections from the external male thread.

7. A refillable supply tank for an inflammable gas comprising:

a tank body defining a container with a wall surrounding a hollow interior for receiving the gas and an opening in the wall;

a valve support component mounted in the opening and defining a passage therethrough extending from an end face of the valve support component into the interior of the tank body;

a valve body in the passage arranged to provide a primary seal of the passage against escape of the gas and operable to open the passage to allow the escape when required;

and a valve protection cap for covering the valve support component with the valve body therein;

the valve protection cap including an upper wall and at least one depending peripheral wall which extends around the valve support component;

wherein the upper wall of the valve protection cap includes an elongate projecting pin member projecting from the upper wall of the valve protection cap to a remote end of the projecting pin member spaced from the upper wall;

wherein the projecting pin member extends into and engages into the passage to provide a secondary seal with the passage to supplement the primary seal of the valve body in the passage;

wherein the projecting pin member is defined by an annular sleeve surrounding a hollow interior where the hollow interior of the sleeve extends along the projecting pin member from the remote end of the projecting pin member to the upper wall; and wherein the annular sleeve has an outside surface extending from the upper wall to the remote end which outside surface tapers from the upper wall to the remote end so that a diameter of the outer surface at the upper wall is greater than a diameter of the outer surface at the remote end and wherein the annular sleeve has an inside surface surrounding the hollow interior extending from the upper wall to the remote end which inside surface tapers from the remote end to the upper wall to so that a diameter of the inside surface at the upper wall is less than a diameter of the inside surface at the remote end.

8. The refillable supply tank according to claim 7 wherein the passage carries an O-ring seal surrounding and engaging the outer surface of the projecting pin member to form the secondary seal therewith, wherein the valve protection cap is arranged such that release of pressure from the tank body through the passage caused by leakage from the valve body causes movement of the upper wall in a direction away from the passage and wherein the projecting pin member is arranged such that the movement of the upper wall under the pressure is insufficient to cause release of the secondary seal between the projecting pin member from the O-ring seal.

9. The refillable supply tank according to claim 8 wherein the diameter of the outer surface at the O-ring seal is arranged such that the outer surface engages and compresses the O-ring seal to form the secondary seal.

10. The refillable supply tank according to claim 9 wherein the movement of the upper wall under the pressure is insufficient to cause the diameter of the tapered outer surface at the O-ring seal to release from engagement and compression of the O-ring seal to form the secondary seal.

11. The refillable supply tank according to claim 8 wherein the projecting pin member has a length from the O-ring seal to the remote end of at least 3 mms and preferably at least 5 mm.

12. The refillable supply tank according to claim 1 wherein the valve body in the passage includes a projecting element extending longitudinally of the passage and operable to open the passage to allow the escape of the gas when required and wherein the projecting element extends into the hollow interior to a position beyond the remote end of the projecting pin member.

13. The refillable supply tank according to claim 7 wherein the valve body in the passage includes a projecting element extending longitudinally of the passage and operable to open the passage to allow the escape of the gas when required and wherein the projecting element extends into the hollow interior to a position beyond the remote end of the projecting pin member.

* * * * *